United States Patent Office.

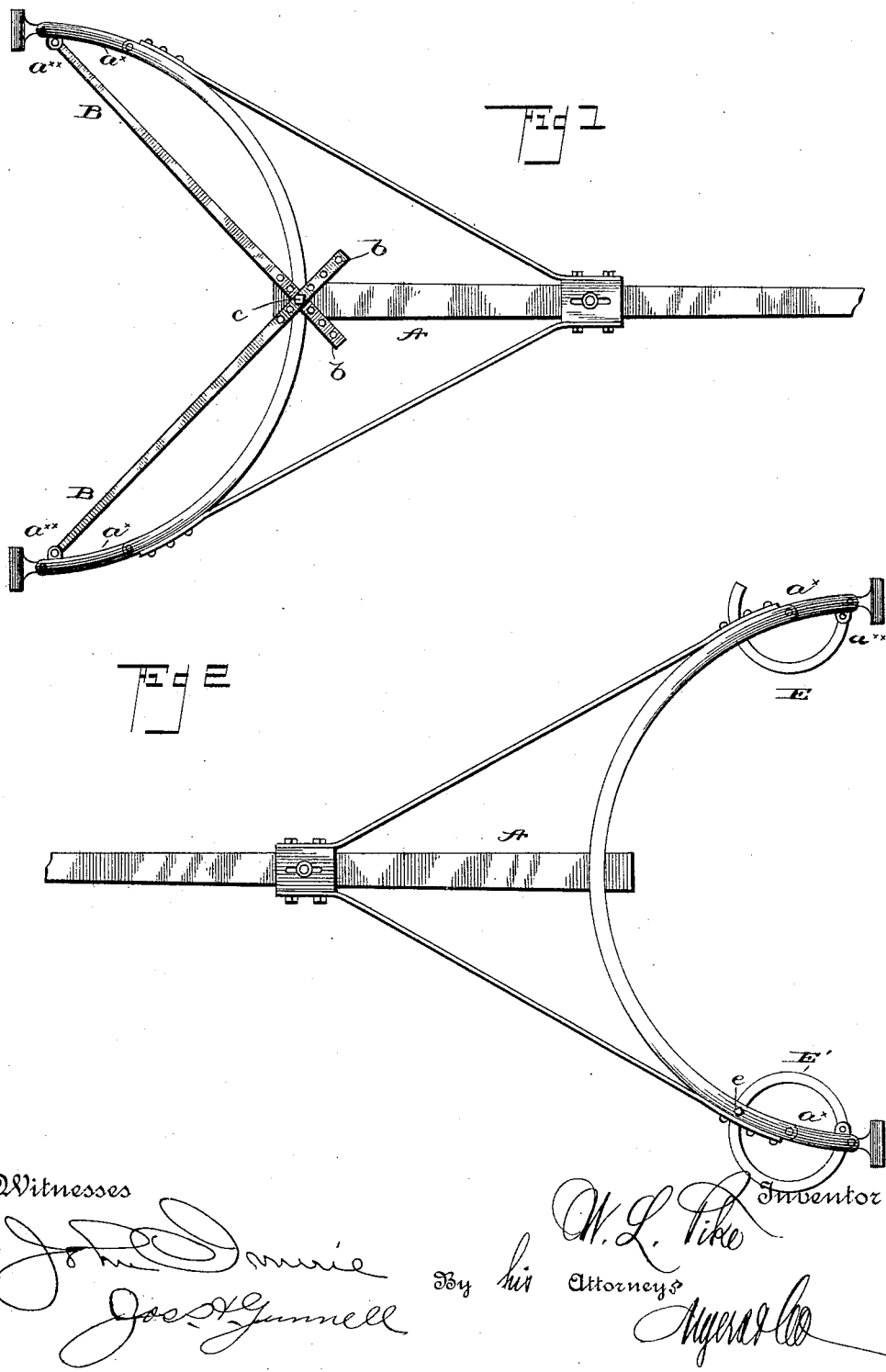

WILLIAM L. PIKE, OF GROTON, NEW YORK.

VEHICLE-POLE.

SPECIFICATION forming part of Letters Patent No. 480,511, dated August 9, 1892.

Application filed October 26, 1891. Serial No. 409,855. (No model.)

*To all whom it may concern:*

Be it known that I, WILLIAM L. PIKE, a citizen of the United States of America, residing at Groton, in the county of Tompkins and State of New York, have invented certain new and useful Improvements in Poles and Shafts for Vehicles, of which the following is a specification, reference being had therein to the accompanying drawings.

My invention relates to improvements in pole or shaft attachments for vehicles or sleds; and it consists in the detailed construction and combination of parts, substantially as hereinafter more fully disclosed, and pointed out in the claim.

In the accompanying drawings, Figure 1 is a plan view of a draft pole or tongue for a vehicle or sled embodying my invention, and Fig. 2 is a similar view of modifications thereof.

In carrying out my invention I provide the inner curved bar of the pole A with pivoted sections or arms $a^x$, the connection between them and the ends of the curved bar being at the forward ends of said sections, and to these sections or arms near their rear ends, as at $a^{xx}$, are pivotally connected the rear ends of levers B. The levers B are provided in their forward portions with adjusting-apertures $b$ and are adapted to cross each other, permitting coincident apertures to register, and through these apertures is adapted to be inserted the adjusting-bolt $c$ or other suitable means to engage an aperture in the curved bar of the pole or tongue to provide for the adjustment of the pivoted sections or arms $a^x$ in accommodating the same to the width of the vehicle or axle.

In the modifications as disclosed in Fig. 2 the serially-apertured levers B are substituted either by a semicircular lever E or a circular lever E', engaged by a corrugated or roughened clamp-box-like arrangement $e$, bolted to the inner curved bar of the pole for the retention at the required point of adjustment of the same.

Having thus fully described my invention, what I claim, and desire to secure by Letters Patent, is—

The draft pole or tongue having at the ends of its curved bar pivoted sections or arms, in combination with the circular levers pivoted to said sections or arms near their rear or inner ends and adapted to be clamped or held to said curved bar, substantially as set forth.

In testimony whereof I affix my signature in presence of two witnesses.

WILLIAM L. PIKE.

Witnesses:
  THOMAS J. DUNN,
  W. H. PIKE.